(No Model.)

G. W. DUVALL.
Boiler Tube Ferrule.

No. 240,818. Patented May 3, 1881.

Witnesses.
Inventor,
George W. Duvall,
By Paine, Grafton & Lord
Attorneys.

UNITED STATES PATENT OFFICE.

GEORGE W. DUVALL, OF NORFOLK, VIRGINIA.

BOILER-TUBE FERRULE.

SPECIFICATION forming part of Letters Patent No. 240,818, dated May 3, 1881.

Application filed February 21, 1881. (No model.)

*To all whom it may concern:*

Be it known that I, GEORGE W. DUVALL, a citizen of the United States, residing at Norfolk, in the county of Norfolk and State of Virginia, have invented certain new and useful Improvements in Boiler-Tube Ferrules; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to furnish a ferrule or thimble for securing the ends of boiler-tubes in tube-sheets, which is more simple in construction and effective in operation than any ferrule heretofore used.

The invention consists in a cylindrical ferrule which is made in one or two parts, and provided with one or more longitudinal slots for the reception of one or more wedge-keys. The ferrule has an outer flange or head, which rests upon the tube-sheet, and is provided with notches or slits in its outer edge for the purpose of permitting the proper expansion of the ferrule when the key or keys are driven into the same.

Figure 1:
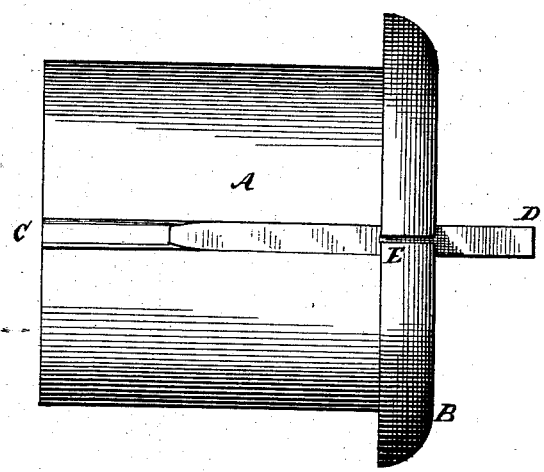
Figure 2:
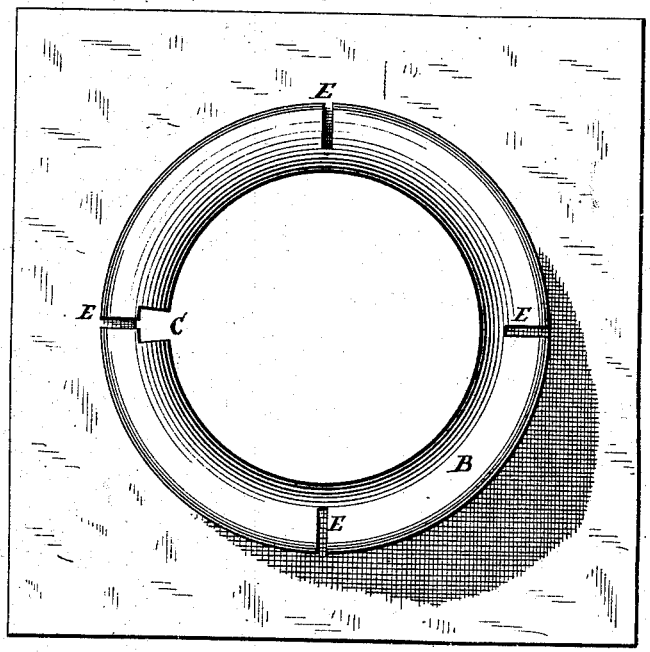

In the drawings, Figure 1 is a side elevation of my improved boiler-tube ferrule. Fig. 2 is a front view, showing the slit flange thereof resting upon the tube-sheet.

The letter A designates a tubular ferrule or thimble, which is constructed with an outer flange, B. In the present instance I have shown the ferrule made in one piece and provided with a single slot, C, extending the entire length thereof. Such a thimble will prove satisfactory for securing boiler-tubes of a small diameter, but for larger tubes the ferrule is generally made in two parts. In this instance the slots are located diametrically opposite to each other, as in my Patent No. 54,703. The slot or slots C in the ferrule are designed for the reception of a removable key or keys, D, for the purpose of expanding the ferrule within the boiler-tube and securing the latter in position.

I have found by actual experience that a divided or split ferrule does not prove entirely satisfactory, and is incapable of being properly expanded after its insertion into the tube, unless the outer flange, which rests upon the tube-sheet, is provided with slits or notches E, as shown in the present instance. These notches or slits extend from the outer edge of the flange of the ferrule nearly to the inner edge thereof, as is clearly shown in Fig. 2.

The key-slot in the ferrule, instead of terminating in a solid or undivided portion of the outer flange, has a slit running from it to the outer edge of the flange. Hence it will be obvious that when the key is inserted into the ferrule and driven into the same the flange of the ferrule, instead of being perfectly rigid and solid, will expand with the body of the ferrule, so as to more effectually secure the latter in the tube. The slot in the ferrule is of a dovetail or wedge shape, so as to receive a correspondingly-shaped key.

A single-piece ferrule provided with a continuous slot and slits in its outer flange is as effective as a two-part ferrule having two key-slots in the flange.

What I claim as new, and desire to secure by Letters Patent, is—

A ferrule provided with one or more longitudinal slots for the reception of keys, and having an outer flange provided with slits or notches extending from the outer edge nearly to the inner edge of said flange, as and for the purpose set forth.

In testimony whereof I affix my signature in presence of two witnesses.

GEORGE WESLEY DUVALL.

Witnesses:
THOMAS U. HARE,
W. S. WILKINSON.